United States Patent [19]

Pozzetti et al.

[11] 4,018,010

[45] Apr. 19, 1977

[54] METHOD AND RELATIVE APPARATUS FOR CONTROLLING AND REGULATING THE WORKING CYCLES OF A MACHINE TOOL

[75] Inventors: Mario Pozzetti, Bologna; Roberto Rossi, Sofia, both of Italy

[73] Assignee: Finike Italiana Marposs-Soc. In Accomandita Semplice di Marlo Possati & C., Bentivoglio, Italy

[22] Filed: Apr. 8, 1975

[21] Appl. No.: 566,674

[30] Foreign Application Priority Data

May 9, 1974 Italy .................................. 3378/74

[52] U.S. Cl. .......................... 51/165.71; 51/165.91; 51/165.88; 51/281 R
[51] Int. Cl.² ......................................... B24B 49/16
[58] Field of Search ................... 51/165.71, 165.93; 318/561; 235/151.11

[56] References Cited

UNITED STATES PATENTS

| | | | |
|---|---|---|---|
| 3,589,077 | 6/1971 | Lenning | 51/165.92 |
| 3,691,357 | 9/1972 | McIntosh | 51/165.71 |
| 3,699,720 | 10/1972 | Lenning | 51/165.77 |
| 3,728,826 | 4/1973 | Wada et al. | 51/165.77 |
| 3,842,545 | 10/1974 | Possati | 51/165.71 |
| 3,898,440 | 8/1975 | Fukuma et al. | 235/151.13 |
| 3,964,210 | 6/1976 | Moritomo | 51/165.71 |

*Primary Examiner*—Eugene G. Botz
*Attorney, Agent, or Firm*—Stevens, Davis, Miller & Mosher

[57] ABSTRACT

A method for controlling and regulating the working cycles of a machine tool on a workpiece, including the steps of measuring the workpiece during the machining and programming the feed speed of the tool depending on another variable quantity, which foresees generating a signal responsive to the elastic strains suffered, during the machining, by the kinematic chain comprising the workpiece and the tool, as a consequence of the tool thrust. The signal is used for controlling the feed speed. An apparatus for controlling and regulating the working cycles of a machine tool including a measuring device for the measurement of the sizes of the workpiece being machined, a stepping motor, a digital counter, a digital analogue converter and adapter responsive to the position of the tool relative to a reference position, a differential amplifier, a program unit for programming the feed speed of the tool and a control unit for varying the feed speed. The stepping motor, digital counter, digital analogue converter and adapter responsive to the position of the tool and the measuring device are connected to the differential amplifier adapted to provide a signal responsive to the elastic strains suffered, during the machining, by the tool, workpiece and kinematic chain, due to the tool thrust. The output of the differential amplifier is connected to the program unit for varying the feed speed of the tool depending on the elastic strains.

13 Claims, 6 Drawing Figures

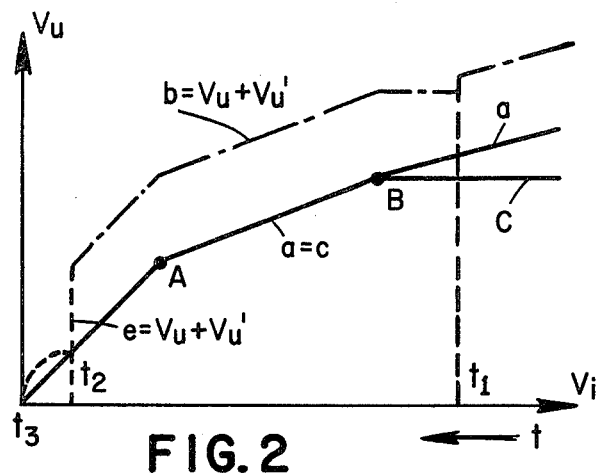
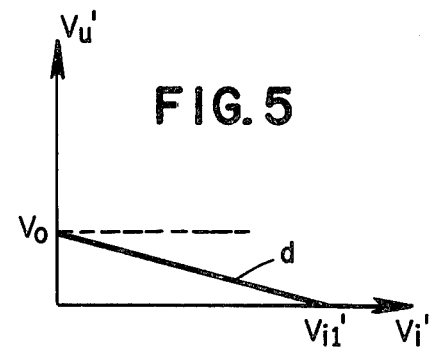
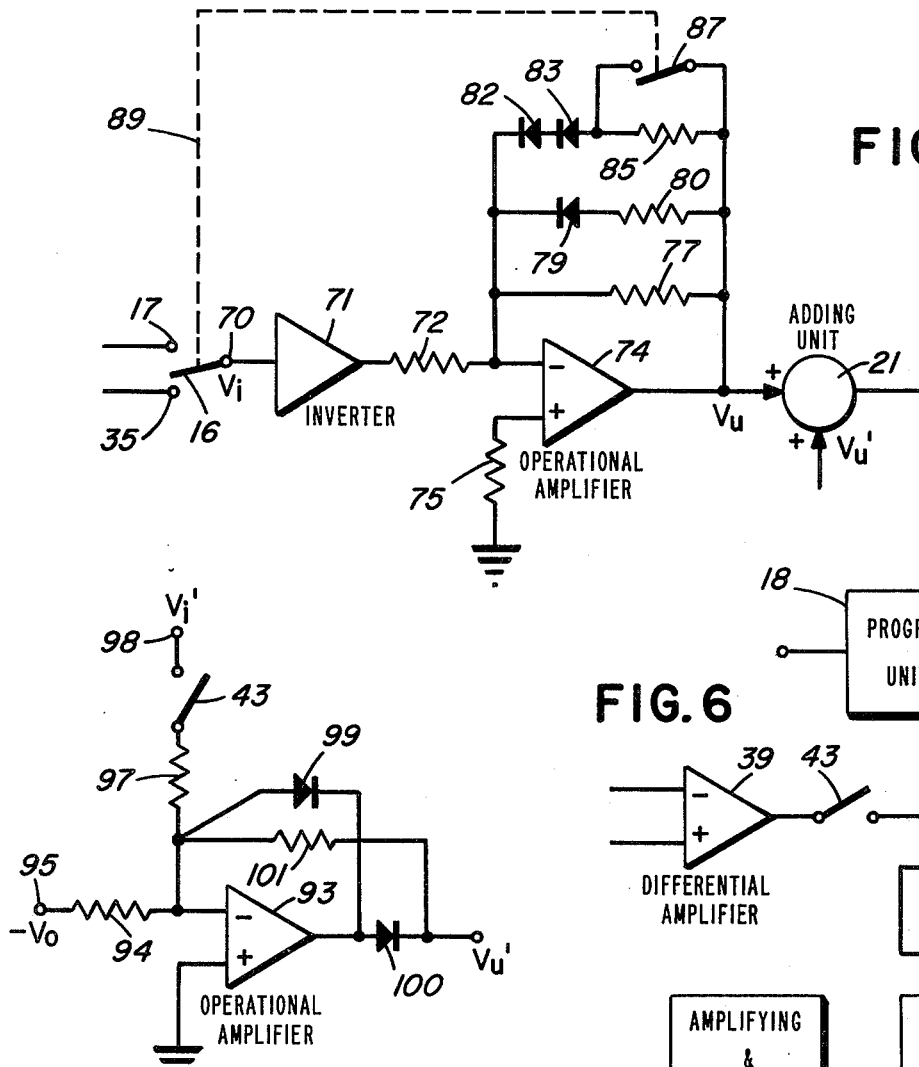
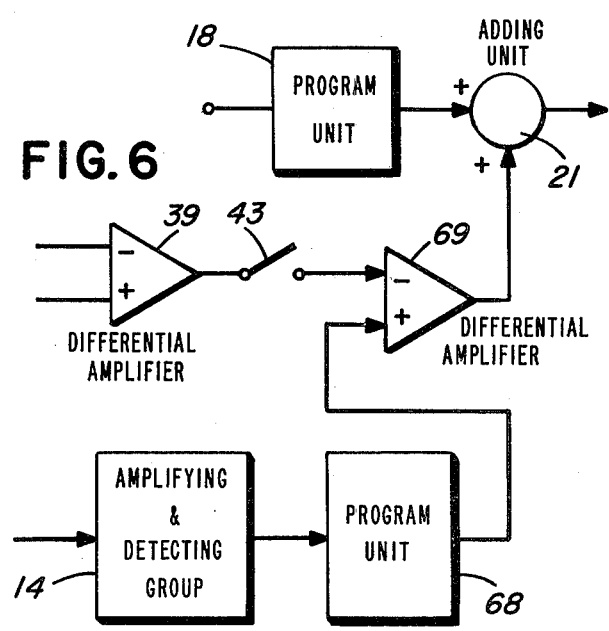

METHOD AND RELATIVE APPARATUS FOR CONTROLLING AND REGULATING THE WORKING CYCLES OF A MACHINE TOOL

The present invention relates to a method for controlling and regulating the working cycles of a machine tool, wherein the workpiece is measured during the machining and the feed speed of the tool towards the workpiece is programmed depending on another variable quantity.

The invention also concerns an apparatus for the embodiment of the method comprising a measuring device for the measurement of the sizes of the workpiece being machined, means responsive to the position of the tool relative to a reference position, program means for programming the feed speed of the tool and control means for varying the feed speed. More particularly, the present invention relates to the control of the feed speed of the grinding wheel of a grinder.

Grinders are already known having a high output per hour, in which the grinding wheel feed speed is programmed and varied, continuously or step-wise, depending on the stock measured on the workpiece being machined. It also is known to vary, in a continuous and adaptive way, this programmed speed depending on the values assumed by other quantities, characteristic of the machining, such as the actual stock removal rate, or the pressure between the grinding wheel and the workpiece.

The purpose of these adaptive controls is to get an improvement in the finishing of workpieces.

These known grinders present some drawbacks.

For example, especially when the stocks to be removed are small and consequently the cycles are short, it often happens that the feedback systems are not sufficiently prompt and accurate.

Moreover, the most refined feedback systems are very complex, poorly flexible and involve a difficult setup.

It is therefore an object of the present invention to provide a method and relative apparatus for the control and regulation which permit to attain a compromise among the requirements of promptness, stability, accuracy, flexibility and price.

Other objects and advantages will appear from the following description of a method for the control and regulation which foresees, according to the invention, generating a signal responsive to the elastic strains suffered by the kinematic chain comprising the workpiece and the tool, as a consequence of the tool thrust. The signal is used for controlling the feed speed.

If compared with the already known control methods which are based on the measurement of either the stock removal rate, or the pressure between grinding wheel and workpiece, the method according to the present invention is advantageous, especially for machinings in which, during the stock removal phases the elements forming the tool-workpiece kinematic chain undergo hard strains, owing to the tool thrust.

As to the grinders, the main elements of the kinematic chain are constituted by workpiece, grinding wheel, spindles, possible shoes and rests, etc. If the strains of the workpiece and of the other elements reach too high values during the machining, permanent deformations and shape defects (ovality, taper, etc.) may be present in the machined workpiece.

As mentioned above, it is already known to control the feed speed depending on the pressure of the tool on the workpiece.

For this purpose, the value assumed by the pressure is obtained by measuring the applied force. This value is rather aleatory since it is not possible to determine the contact area with sufficient accuracy.

However, in this way the strains suffered by the tool-workpiece kinematic chain are not taken into consideration.

An apparatus for the embodiment of the method of the present invention comprises a measuring device for the measurement of the sizes of the workpiece being machined, means responsive to the position of the tool relative to a reference position, program means for programming the feed speed of the tool and control means for varying said feed speed. The apparatus is characterized in that the means responsive to the position of the tool and the measuring device are connected to comparison means adapted to provide a signal responsive to the elastic strains suffered, during the machining, by the tool-workpiece kinematic chain, due to the tool thrust, the output of the comparison means being connected to the program means for varying the feed speed of the tool, depending on the elastic strains.

The method and relative apparatus of the present invention will be described in detail with reference to preferred embodiments given as non-limiting examples and illustrated in the attached drawings, in which:

FIG. 2 shows some diagrams illustrating the working of the machine of FIG. 1;

FIGS. 3 and 4 show some circuits for realizing the program units comprised in the apparatus of FIG. 1;

FIG. 5 is a diagram illustrating the working of the program unit of FIG. 4; and

FIG. 6 shows a variant to the apparatus of FIG. 1.

Figure 1:
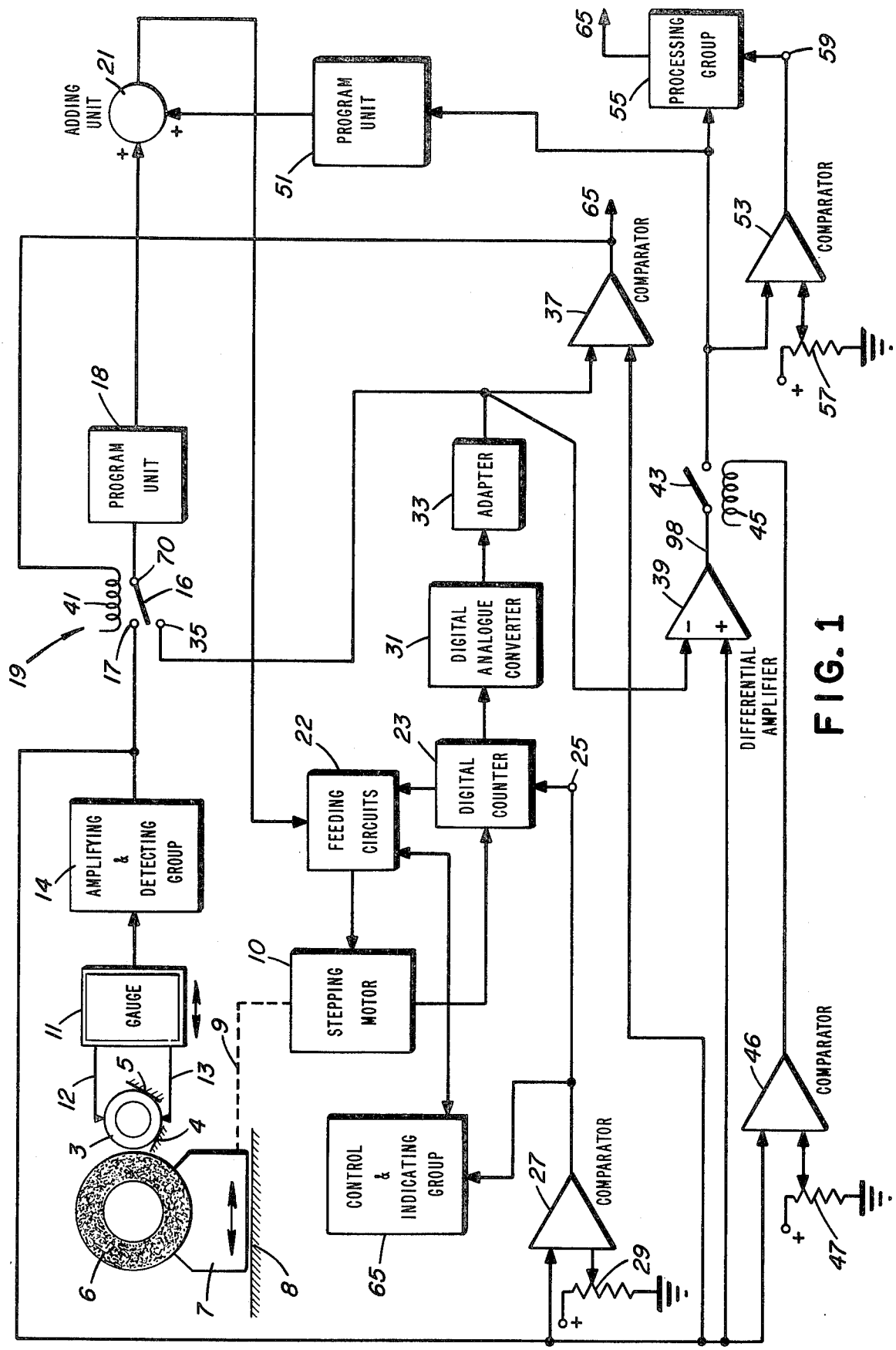
FIG. 1 is a scheme in block from of an apparatus for the control and regulation of the working cycles in an external grinder with a high output per hour.

With reference to FIG. 1, rings 3, resting on shoes 4, 5 and driven in rotation through a spindle, not shown, are ground on the outer surface by the grinding wheel 6 of a high output grinder.

Grinding wheel 6 is mounted on a slide 7 movable on a base 8.

Slide 7 is moved by a stepping motor 10 which acts, through the functional connection shown in the figure by a dashed line 9, on a screw-nut screw precision system, not shown.

The ring is measured by an electronic gauge 11 provided with movable arms 12, 13 and position transducers, not shown.

Gauge 11 is connected to an amplifying and detecting group 14 which provides, on its output, an analogue signal proportional to the stock of ring 3, i.e., to the difference between the actual outer diameter and the nominal diameter to be attained at the end of the machining. The output terminal 17 of group 14 can be connected, through a contact 16 of a relay 19, to a program unit 18 which provides on its output a voltage continuously variable depending on the input signal, as described below.

The program unit 18 is connected to one input of an adding unit 21, the output of which is connected to feeding circuits 22 of stepping motor 10. The circuits comprise a voltage-frequency converter which provides on its output pulses of frequency proportional to the analogue input quantity, the pulses causing subsequent steps of the rotor of motor 10 and consequently of slide 7.

A digital counter 23 connected to motor 10 and circuits 22 counts the number of steps made by the rotor.

Counter 23 has a RESET terminal 25 connected to the output of a comparator 27 provided with two inputs, which are respectively connected to the output of group 14 and to a potentiometer 29, adapted to generate an adjustable reference voltage.

The output of counter 23 is connected to a digital-analogue converter 31 which is in turn connected to an adapter 33.

The output of adapter 33 is connected, respectively, to a terminal 35, with which contact 16 of relay 19 may cooperate, to one input of a comparator 37 and to the negative input of a differential amplifier 39. The other inputs of comparator 37 and differential amplifier 39 are all connected to the output of group 14.

The output of comparator 37 is connected to a winding 41 of relay 19. In series with the output of differential amplifier 39 there is disposed a contact 43 which is switched by an excitation winding 45. Winding 45 is connected in series with the output of a comparator 46, the inputs of which are connected to group 14 output and to a potentiometer 47 which provides an adjustable reference voltage.

The output of differential amplifier 39 is respectively connected, through contact 43, to the input of a program unit 51, one input of a comparator 53 and one input of a processing group 55 which controls the dressing of grinding wheel 6.

The relationship between the input voltage $V_i'$ and the output voltage $V_u'$ of unit 51 is shown in FIG. 5.

The output of unit 51 is connected to a second input of adding unit 21. The second input of comparator 53 receives an adjustable reference voltage through a potentiometer 57; the output of comparator 53 is connected to a consent terminal 59 of processing group 55.

Moreover, the grinder is provided with a control and indicating group 65 which controls the different phases of the machining cycle. To group 65 there are connected the outputs of comparator 27, processing group 55 and comparator 37.

The operation of the grinder is as follows.

When the diameter of a ring 3 machined by grinding wheel 6 is reduced until it reaches the nominal value, the output signal of group 14 assumes a value which causes the commutation of comparator 27.

Then the output signal of comparator 27 sets to zero counter 23 and makes control group 65 start the last operations of the machining cycle. The last operations comprise stopping motor 10 and the subsequent reversal of its movement to bring back slide 7, withdrawing gauge 11 (which is mounted on a carriage, not shown) from ring 3, unloading the machined ring and the loading of a new ring to be ground (through loading and unloading arms which are known per se) and returning gauge 11 to the measuring position.

The rotation of motor 10 for bringing back slide 7 takes place, at the highest speed, under the driving of group 65, which is connected in turn to feeding circuits 22. Starting from the stop position, slide 7 goes back for a fixed length, which is set on counter 23 on the basis of the maximum diameter that rings 3 may have before the grinding.

Counter 23 counts the number of steps of motor 10 until reaching the count corresponding to the pre-set value. Motor 10 then stops and reverses again the direction of rotation for bringing grinding wheel 6 towards a new ring 3 which is already loaded or in the loading phase. When grinding wheel 6 moves towards ring 3 contact 16 is closed on terminal 35 (relay 19 is de-energized) and the approach speed is determined as follows.

The output digital signal of counter 23 is converted into an analogue signal by converter 31.

The output signal of converter 31 is responsive to the position of slide 7 and indicates approximately the movement to be made by grinding wheel 6 for reaching a position which corresponds to the attainment of stock equal to zero on ring 3.

Since counter 23 is set to zero when attaining the final diameter of each ring 3 and then slide 7 is brought back for a fixed length, in this way the wear of grinding wheel 6 is compensated (therefore, at the end of the run for moving away from rings 3, the position of slide 7 is variable).

Depending on the shape of either grinding wheel 6 and rings 3 and the relative position of their axes, to a grinding wheel forward feed having a value L corresponds (apart from flexions and strains of the workpiece-grinding wheel kinematic chain, i.e., assuming they do not exist) a theoretical reduction of the ring 3 diameter (if the grinding wheel is supposed to be in contact with the ring) variable usually between the values L and 2L, owing to the type of grinder.

Adapter 33 considers this fact by transforming the signals relating to the displacements of slide 7 into fictive variations of stock, the variations being fictive since grinding wheel 6 may be in a position not to contact ring 3 and furthermore, when said contact is obtained, said strains, the variability of the grinding wheel cutting capacity and other factors make said relationship not to be exactly constant during the machining in the same machine.

However, when grinding wheel 6 approaches ring 3, i.e., before contacting it, the difference between the output signal of adapter 33 and the initial diameter of ring 3 (measured by gauge 11) represents a component of the distance to be run by slide 7 before grinding wheel 6 contacts ring 3.

During the approach, slide 7 speed is determined by program unit 18, which receives at the input a signal $V_i$ provided by adapter 33. Program unit 18 provides a signal $V_u$, the amplitude of which varies according to the curve $a$ of FIG. 2.

During the approach, contact 43 is open and program unit 51 provides an output signal $V_u'$ having constant amplitude equal to the max. value $V_o$ of the curve $d$ in FIG. 5.

Adding unit 21 adds up signals $V_u$ and $V_u'$ received and provides an output signal varying in accordance with the dashed and dotted curve $b$ shown in FIG. 2.

Accordingly, stepping motor 10 controls the forward movement of slide 7. When grinding wheel 6 contacts ring 3, comparator 37 commutates, thus giving a control signal of "gap elimination" end.

This signal can be obtained shortly before or after the contact, by adding to or subtracting from the output signal of group 14, which is fed to comparator 37, a suitable correcting signal.

From the curve $b$ of FIG. 2 it is easy to notice the gradual decreasing of the feed speed during the approach phase, until grinding wheel 6 gets in touch with ring 3; at this instant $t_1$ a step decrease is obtained. In fact, the commutation of comparator 37 causes the excitation of winding 41 which switches off contact 16 from terminal 35 and then closes it on terminal 17.

From instant $t_1$ on, the output signal $V_u$ of unit 18 varies according to the curve $c$ of FIG. 2 and the signal $V_o$ of constant amplitude generated by program unit 51 is continuously added to it, so that feeding circuits 22 still receive a signal corresponding to the curve $b$ of FIG. 2 and operate motor 10 accordingly.

Grinding wheel 6 removes stock from ring 3.

When ring 3 reaches a pre-set stock value the output voltage of group 14 assumes a value equal to that provided by potentiometer 47 and comparator 46 commutates causing in this way the excitation of winding 45, which in turn closes contact 43 (instant $t_2$ of FIG. 2). The output voltage of differential amplifier 39 is responsive to the elastic strains suffered by the kinematic chain comprising ring 3 and grinding wheel 6, due to the thrust of grinding wheel 6. In fact the voltage corresponds to the difference between the stock of ring 3 and the fictive stock mentioned above.

Precisely the voltage indicates the strain increase in respect to the total strain attained when ring 3 is reaching the final diameter. Due to the closure of contact 43, the strain signal arrives at program unit 51 which generates an output signal $V_u'$ depending on the input signal $V_i'$ according to the curve $d$ of FIG. 5.

Therefore a low output voltage (or no output voltage at all) corresponds to a hard strain and vice versa.

From instant $t_2$ corresponding to the closure of contact 43 the output signal of adding unit 21 varies according to the dashed curve $e$ of FIG. 2.

From instant $t_2$ onwards, to signal $V_u$, corresponding to the curve $c$, the variable signal $V_u'$, corresponding to the curve $d$ is added up. In this way, if an overstrain is detected, stepping motor 10 is considerably slowed down, thus permitting a reduction of the strain.

The machining continues with the adaptive control depending on the strain until when, on instant $t_3$, gauge 11 detects the attainment of the final diameter of ring 3.

Then there is obtained the control of the last operations of the machining, cycle, which take place in accordance with the above description.

From what is said afore, it can be noticed that the speed of motor 10 is always determined by the sum $V_u + V_u'$ of both output signals of program units 18 and 51.

After the closure of contact 43 the control effected is an adaptive control. In fact the program supplied by unit 18 is corrected through a variable correction signal, provided by unit 51 depending on an output quantity, the latter being the measured strain.

The adaptive control also may be carried out in a different way, for example as shown in FIG. 6.

With reference to the apparatus of FIG. 1, program unit 51 is substituted by another program unit 68, connected with group 14, and by a differential amplifier 69 the inputs of which are connected to the output of differential amplifier 39 and the output of program unit 68. The remaining part of the apparatus is to be considered unchanged. Program unit 68 generates, depending on the stock measured on ring 3 being machined, a signal responsive to the allowable strain. This signal is compared, in differential amplifier 69, with the signal responsive to the actual strain so that the resulting signal constitutes a correction of the programmed feed speed provided by program unit 18. It also is possible, after the closure of contact 43, to disconnect program unit 18 and to let the machining go on depending on the output signal of program unit 51 which, if this is the case, can be modified to supply a different program.

Another variant is to leave program unit 18 connected and then to control the connection of program unit 51 (after reaching the pre-determined stock) only if the measured strain exceeds a pre-set value.

The variant can be realized using comparator 53 which receives at one input (after the closure of contact 43) the strain signal and compares it with the reference signal provided by potentiometer 57.

However in the apparatus of FIG. 1 comparator 53 is used for a different purpose, and precisely for supplying a consent signal to processing group 55 which controls the dressing of grinding wheel 6.

Processing unit 55 is built substantially according to what is described in U.S. Pat. No. 3,895,526.

This patent discloses a method and relative apparatus for checking the cutting capacity of the grinding wheel of a grinder.

According to the patent, the checking is made at preset phases of the machining cycle of each workpiece, by detecting signals depending on the cutting capacity of the grinding wheel such as the stock removal speed or the time necessary to remove a certain amount of stock. The signals are then compared with pre-set values in order to obtain error signals, the error signals being integrated for the subsequent workpieces. The circuits shown in the patent can be used, after being simply modified, for integrating error signals responsive to the deviations of the actual strain suffered by the grinding wheel workpiece kinematic chain (on pre-set instants of the machining cycle) from a pre-determined strain. There is now described, with reference to FIG. 3, a circuit adapted to realize program unit 18.

The input terminal 70 of unit 18 is connected, through an inverter 71 and a resistance 72, to the negative input of an operational amplifier 74, the positive input of which is grounded through a resistance 75. Between the output of amplifier 74 and its negative input there are connected three branches in parallel.

The first branch is constituted by a resistance 77, the second branch by a diode 79 in series with a resistance 80 and the third branch by the series connection of two diodes 82, 83 and a resistance 85.

Resistance 85 can be short-circuited through a contact 87 which is mechanically linked with contact 16 by means of a link 89.

When contact 16 is closed on terminal 17, contact 87 is closed too. On the contrary, when contact 16 is closed on terminal 35, contact 87 is open.

In FIG. 2, points A and B correspond to the threshhold of diode 79 and the threshholds of two diodes 82, 83 respectively.

Program unit 51 can be realized as shown in FIG. 4.

The negative input of operational amplifier 93 is connected, through a resistance 94, with a terminal 95 on which a constant voltage $-V_o$ is applied.

The negative input also is connected, through a resistance 97 and contact 43, with a terminal 98 constituting the output of differential amplifier 39.

Between the negative input and the output of amplifier 93 there is connected a diode 99.

In a series with the output of amplifier 93 there is another diode 100, the cathode of which is connected to the negative input of amplifier 93, through a resistance 101.

With reference to FIG. 5, when the value of voltage $V_i'$ is equal to O (absence of elastic strain), or when contact 43 is open, the output voltage $V_u'$ is equal to $V_o$.

When contact 43 is closed and the value of $V_i'$ is intermediate between zero and $V_{it}'$, the effect of $V_i'$ is opposed to the effect of $V_o$ and the output voltage $V_u'$ varies according to the segment joining the point $V_{it}'$ on the abscissas to the point $V_o$ on the ordinates.

If the input voltage is higher than or equal to $V_{it}'$, the value of the output voltage $V_u'$ is equal to zero, consequently the speed of slide 7 (FIG. 1) is determined only by program unit 18.

Obviously, the above-described embodiments can undergo other changes and variants without falling outside of the scope of the present invention.

What is claimed is:

1. Method for automatically controlling the working cycles of a machine tool on a workpiece, the machine tool including a tool and a movable tool support, comprising:
   measuring the workpiece during the machining for generating a signal responsive to the workpiece size; programming the feed speed of the tool support, at least in the last phases of the machining, depending on the measured sizes of the workpiece; generating a signal responsive to the tool support position with respect to a reference condition; comparing said signals to obtain a signal responsive to the elastic strains suffered, during the machining, by the kinematic chain including the workpiece and the tool, as a consequence of the tool thrust; and changing the programmed feed speed of the tool support depending on said signal responsive to the elastic strains.

2. Method for automatically controlling the working cycles of a grinding machine on a workpiece, the grinding machine including a movable slide carrying a grinding wheel, comprising:
   generating a signal responsive to the position of the grinding wheel relative to a reference condition, said signal being used as an indication of the distance of the grinding wheel from the workpiece; measuring the workpiece during the machining for generating a signal responsive to the workpiece size; programming the approach speed of the wheel slide depending on said signal responsive to the grinding wheel position; programming the feed speed of the wheel slide for stock removal, at least in the last phases of the machining, depending on the measured sizes of the workpiece; comparing said signals to obtain a signal responsive to the elastic strains suffered, during the machining, by the kinematic chain including the workpiece and the grinding wheel, as a consequence of the grinding wheel thrust; and changing the programmed feed speed of the wheel slide depending on said signal responsive to the elastic strains.

3. The method according to claim 2, wherein said programming steps include defining an approach phase in which the approach speed decreases gradually and one phase, at the contact of the grinding wheel with the workpiece, in which the slide speed is reduced by a step variation.

4. Method for automatically controlling the working cycles of a grinding machine on a workpiece, the grinding machine including a movable slide carrying a grinding wheel, comprising:
   generating a signal responsive to the displacements of the movable slide from a reference start condition, this signal being usable as indicative of the distance between the grinding wheel and the workpiece; measuring the workpiece during the machining, said measuring step including generating a signal responsive to the workpiece stock; comparing said signal indicative of the distance with said signal responsive to the stock, said comparing step including obtaining a signal responsive to the elastic strains suffered, during the machining, by the kinematic chain including the workpiece and the grinding wheel as a consequence of the grinding wheel thrust; programming the feed speed of the wheel slide, said programming step including defining a first phase in which the feed speed is programmed depending on said signal indicative of the distance between the grinding wheel and the workpiece, a subsequent second phase in which said speed is programmed depending on said signal responsive to the workpiece stock and a subsequent third phase in which the speed is programmed depending on said signal responsive to the workpiece stock and said programmed speed is modified depending on said signal responsive to the elastic strains.

5. Method for automatically controlling the working cycles of a grinding machine on workpieces, the grinding machine including a movable slide carrying a grinding wheel and means for dressing the grinding wheel, comprising:
   generating a signal responsive to the displacements of the movable slide from a reference condition, said signal being usable as indicative of the distance of the grinding wheel from the workpiece; measuring the workpiece during the machining, said measuring step including generating a signal responsive to the workpiece size; comparing said signal indicative of the distance with said signal indicative of the workpiece size, said comparing step including obtaining a signal responsive to the elastic strains suffered, during the machining, by the kinematic chain including the workpiece and the grinding wheel as a consequence of the grinding wheel thrust; controlling the grinding operation by means of the above mentioned three signals, said controlling step including controlling the dressing of the grinding wheel by processing subsequent values of said signal responsive to the elastic strains.

6. The method according to claim 5, wherein said processing of subsequent values of said signal responsive to the elastic strains including detecting, in pre-set phases of the machining of subsequent workpieces, a value depending on said signal responsive to the elastic strains, making a comparison of the detected value with a reference value and combining the values resulting from said comparison for the subsequent workpieces.

7. Apparatus for controlling and regulating the working cycles of a machine tool on a workpiece, the machine tool including a tool and a movable tool slide, comprising:
   a measuring device for the measurement of the size of the workpiece being machined;

stepping motor means including a stepping motor for driving the slide carrying the tool;

means responsive to the position of the tool slide relative to a reference position and including a digital counter coupled to said motor means for counting the number of motor steps made starting from said reference position and zero setting means for setting to zero the counter in correspondence with said reference position; program means coupled to said measuring device and to the stepping motor means for programming the feed speed of the tool slide at least in the last phases of the machining depending on the measured sizes of the workpiece;

comparison means connected to said measuring device and to the means responsive to the tool slide position for providing an output signal responsive to the elastic strains suffered, during the machining, by the kinematic chain including the workpiece and the tool, as a consequence of the tool thrust; and control means connected to the comparison means for receiving said output signal and to the program means, for changing the programmed speed of the tool slide depending on said output signal.

8. Apparatus for controlling and regulating the working cycles of a grinding machine on a workpiece, the grinding machine including a movable slide carrying a grinding wheel, comprising:

a measuring device for measuring the size of the workpiece being machined;

stepping motor means including a stepping motor for driving the grinding wheel slide;

means responsive to the position of the grinding wheel slide relative to a reference position and including a digital counter coupled to said motor means for counting the number of steps made by the stepping motor starting from a reference position and zero-setting means for setting to zero the counter in correspondence with said reference position;

program means coupled to the measuring device, the means responsive to the position of the grinding wheel slide and the stepping motor means for programming the approach and feed speeds of the grinding wheel slide depending on the size of the workpiece and the position of the grinding wheel slide;

comparison means coupled to the measuring device and the means responsive to the position of the grinding wheel slide for providing an output signal responsive to the elastic strains suffered, during the machining, by the kinematic chain including the workpiece and the grinding wheel, as a consequence of the grinding wheel thrust; and control means connected to the comparison means for receiving said output signal and to the program means for changing the feed speed of the grinding wheel slide depending on said signal responsive to the elastic strains.

9. The apparatus according to claim 8, further including switching means connected to said measuring device, for connecting said comparison means to said program means when the stock of the workpiece being machined reaches a pre-set value.

10. Apparatus for controlling and regulating the working cycles of a grinding machine on a workpiece, the grinding machine including a movable slide carrying a grinding wheel, comprising:

a measuring device for providing an analog signal responsive to the size of the workpiece being machined; stepping motor means with a stepping motor adapted to drive the grinding wheel slide;

means responsive to the position of the grinding wheel slide relative to a reference position, including a digital counter coupled to said motor means for counting the number of steps made by the stepping motor starting from a reference position, zero-stepping means for setting to zero the counter in correspondence with said reference position, a digital-analogue converter connected to the counter to convert the output signal of the counter into an analogue signal, and an adapter for transforming said analogue signal into a signal indicative of a fictive stock that should be removed due to the grinding wheel feed; comparison means coupled to the measuring device and said adapter for providing an output signal responsive to the elastic strains suffered, during the machining, by the kinematic chain including the workpiece and the grinding wheel, as a consequence of the grinding wheel thrust;

control means for controlling the approach and feed speed of the grinding wheel slide, the control means including a first switching device having inputs coupled to said measuring device and said adapter, respectively, and a control terminal; a first comparator having inputs connected to said measuring device and said adapter, respectively, and an output connected to said control terminal; a first program unit having an input coupled to the output of said switching device; a second switching device arranged at the output of said comparison means; a second program unit with an input connected to the output of the second switching device; and an adding device having inputs connected to the first and second program units, respectively, and an output connected to said stepping motor means, whereby the stepping motor means is controlled by signals provided by the first and second program units.

11. The apparatus according to claim 10, wherein said zero-setting means includes a second comparator coupled to the measuring device and to the counter for zero-setting the counter when the second comparator indicates that the size of the work-piece being machined has reached a final desired value.

12. The apparatus according to claim 10, further comprising a dressing apparatus for dressing the grinding wheel, the dressing apparatus including a processing and control group connected to the comparison means for receiving and processing values responsive to said elastic strains and for controlling the dressing depending on the results of said processing.

13. The apparatus according to claim 10, further comprising a third comparator connected to the measuring device and wherein the second switching device has a control terminal connected to said third comparator for connecting the second program unit with the comparison means when the measured size of the workpiece being machined reaches a pre-established value.

* * * * *

UNITED STATES PATENT AND TRADEMARK OFFICE
CERTIFICATE OF CORRECTION

PATENT NO. : 4,018,010
DATED : April 19, 1977
INVENTOR(S) : Mario POZZETTI et al It is certified that error appears in the above-identified patent and that said Letters Patent are hereby corrected as shown below:

[75]   Line 2, cancel "Sofia" and insert -- S. Sofia --.

[73]   Line 2, cancel "Marlo" and insert -- Mario --.
Column 2, line 30, cancel "from" and insert -- form --.
Column 7, lines 8, 10 and 12, cancel "$V_{i1}'$" and insert
-- $V_{i1}'$ --.

Signed and Sealed this nineteenth Day of July 1977

[SEAL]

Attest:

RUTH C. MASON
*Attesting Officer*

C. MARSHALL DANN
*Commissioner of Patents and Trademarks*